(12) United States Patent
Inoue et al.

(10) Patent No.: US 8,359,046 B2
(45) Date of Patent: Jan. 22, 2013

(54) CONTROL APPARATUS AND MOBILE TERMINAL

(75) Inventors: Masahiro Inoue, Yokosuka (JP); Ichiro Okajima, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1007 days.

(21) Appl. No.: 10/561,445

(22) PCT Filed: Jun. 18, 2004

(86) PCT No.: PCT/JP2004/008637
§ 371 (c)(1),
(2), (4) Date: Nov. 21, 2006

(87) PCT Pub. No.: WO2004/114703
PCT Pub. Date: Dec. 29, 2004

(65) Prior Publication Data
US 2007/0104156 A1 May 10, 2007

(30) Foreign Application Priority Data
Jun. 20, 2003 (JP) .............................. P2003-176800

(51) Int. Cl.
*H04W 68/00* (2009.01)
(52) U.S. Cl. ........................ 455/458; 709/238
(58) Field of Classification Search .................. 455/560, 455/458, 418; 370/331, 338; 709/238
See application file for complete search history.

(56) References Cited

U.S. PATENT DOCUMENTS

| | | | |
|---|---|---|---|
| 6,859,653 B1 * | 2/2005 | Ayoub et al. | 455/435.2 |
| 7,392,056 B2 * | 6/2008 | Corson et al. | 455/456.1 |
| 2004/0136351 A1 * | 7/2004 | Omae et al. | 370/338 |
| 2004/0156346 A1 * | 8/2004 | O'Neill | 370/338 |
| 2004/0203894 A1 * | 10/2004 | Watanabe et al. | 455/456.1 |
| 2004/0254980 A1 * | 12/2004 | Motegi et al. | 709/203 |
| 2006/0025161 A1 * | 2/2006 | Funato et al. | 455/458 |
| 2007/0060175 A1 * | 3/2007 | Park et al. | 455/458 |

FOREIGN PATENT DOCUMENTS

| | | |
|---|---|---|
| EP | 1 124 399 A1 | 8/2001 |
| EP | 1 301 052 A2 | 4/2003 |
| EP | 1 301 052 A3 | 4/2003 |
| JP | 2002-247104 | 8/2002 |

(Continued)

OTHER PUBLICATIONS

Claude Castelluccia, et al., "An Adaptive Per-Host IP Paging Architecture", Computer Communication Review, XP001115325, Oct. 1, 2001, pp. 48-56.*

*Primary Examiner* — Kamran Afshar
*Assistant Examiner* — Khawar Iqbal
(74) *Attorney, Agent, or Firm* — Oblon, Spivak, McClelland, Maier & Neustadt, L.L.P.

(57) ABSTRACT

A controller apparatus, when it receives packets addressed to a mobile terminal, implements paging control in which it transmits a paging notification packet to a paging area of the mobile terminal, so as to obtain location information on the mobile terminal and to determine a forwarding destination of the packets. The controller apparatus includes a paging area forming unit having a plurality of algorithms for forming the paging area. The paging area forming unit is configured to form the paging area of the mobile terminal by an algorithm specified by the mobile terminal.

9 Claims, 10 Drawing Sheets

FOREIGN PATENT DOCUMENTS

| | | |
|---|---|---|
| JP | 2003-110498 | 4/2003 |
| JP | 2003-143643 | 5/2003 |
| JP | 2003-259412 | 9/2003 |
| JP | 2003-284117 | 10/2003 |
| WO | WO 94/07337 | 3/1994 |
| WO | WO 94/11997 | 5/1994 |
| WO | WO 94/13114 | 6/1994 |
| WO | WO 98/25420 | 6/1998 |
| WO | WO 02/37258 A1 | 5/2002 |

* cited by examiner

| CURRENT LOCATION INFORMATION | PAGING AREA |
|---|---|
| XXX | A,B,C |
| YYY | D,E,F |
| ⋮ | ⋮ |

(b)

| TIME | PAGING AREA |
|---|---|
| 00:00 – 09:00 | A,B,C |
| 09:00 – 17:00 | D,E,F |
| ⋮ | ⋮ |

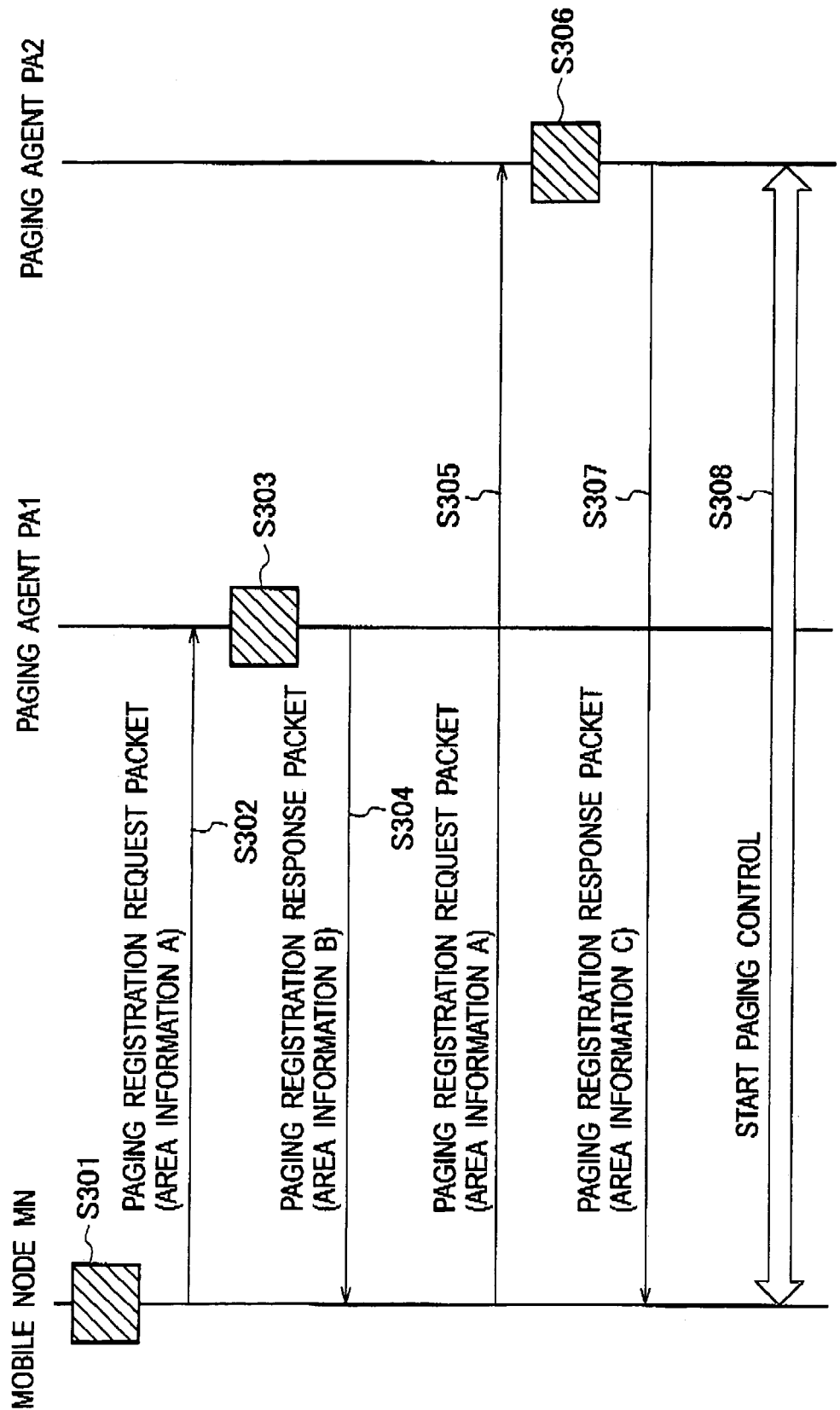

CONTROL APPARATUS AND MOBILE TERMINAL

TECHNICAL FIELD

The present invention relates to a controller apparatus and a mobile terminal for implementing paging control in which, when packets addressed to a certain mobile terminal are received, a paging notification packet is transmitted to a paging area of the mobile terminal, so as to obtain location information on the mobile terminal and to determine a forwarding destination of the packets.

BACKGROUND ART

Generally, paging control is a technology with which a mobile terminal (mobile host) performs location registration in a paging area larger than a location registration area, thereby reducing the volume of control signals for location registration and also implementing power conservation in conjunction with intermittent reception technology of the mobile terminal.

For reducing the volume of control signals for location registration, consideration must be given to how much the effect of reducing the number of location registrations at a mobile terminal is cancelled by generation of a signal (paging notification packet) for notifying the mobile terminal of an incoming communication.

In this respect, conventional paging control has sought to reduce as much the volume of control signals for location registration as possible, by defining a paging control procedure unique to a mobile communications system and also forming a paging area which optimizes the number of location registrations and the number of times of paging.

Paging control in "Mobile IP" and its extended methods is used for reducing the transmission of "biding update packets" as location registration packets. A mobile terminal in paging control mode does not transmit a binding update packet to a controller apparatus (mobility control node) which manages the packet forwarding route, when it moves between location registration areas (subnets) belonging to the same paging area. A mobile terminal in paging control mode is notified of the arrival of packets addressed to the mobile terminal by a paging notification packet transmitted within a paging area of the mobile terminal. Thus, also in this technology, it is important to determine a paging area of an appropriate size.

Therefore, for a paging area forming method, various proposals and implementations have been made in each mobile communications system with consideration given to a communicating use and movement characteristics of a mobile terminal, the load conditions of a controller apparatus, and so on.

For example, a method is known in which, in each mobile communications system, a controller apparatus obtains the movement characteristics of a mobile terminal from access points (e.g., base stations) which the mobile terminal went through, location information on the mobile terminal measured by GPS, the movement speed of the mobile terminal, or the like, so as to form a paging area of an optimum configuration.

In conventional paging control, however, only one or several paging area forming methods (algorithms) are implemented which are premised on a certain communicating use and movement characteristics of a mobile terminal within a single mobile communications system.

Consequently, there is the problem that, in a universal IP network where various communicating uses and movement characteristics of mobile terminals are expected, use of the conventional paging control increases the case where premises on a communicating use and movement characteristics of a mobile terminal are not met, and cannot reduce the volume of control signals for location registration.

There is also the problem that, in order to reduce the volume of control signals for location registration by the conventional paging control in the universal IF network, it is necessary to implement a considerable amount of paging area forming methods to deal with all communicating uses and movement characteristics of mobile terminals which are expected in the universal IF network, resulting in increased implementation loads in controller apparatuses and mobile terminals.

The present invention has been made in view of the above problems, and has an object of providing a controller apparatus and a mobile terminal which enable forming an optimum paging area for a communicating use or movement characteristics of the mobile terminal by cooperation between the controller apparatus and the mobile terminal.

DISCLOSURE OF THE INVENTION

A first aspect of the present invention is summarized as a controller apparatus configured to implement paging control in which, when the controller apparatus receives a packet addressed to a mobile terminal, the controller apparatus transmits a paging notification packet to a paging area of the mobile terminal, so as to obtain location information on the mobile terminal and to determine a forwarding destination of the packet, the controller apparatus comprising a paging area forming unit having a plurality of algorithms for forming the paging area; wherein the paging area forming unit is configured to form the paging area of the mobile terminal by an algorithm specified by the mobile terminal.

In the first aspect of the present invention, the paging area forming unit may be configured to form the paging area of the mobile terminal, in accordance with a load condition or traffic distribution of the controller apparatus.

A second aspect of the present invention is summarized as a mobile terminal configured to implement paging control in which, when a controller apparatus receives a packet addressed to a mobile terminal, the controller apparatus transmits a paging notification packet to a paging area of the mobile terminal, so as to obtain location information on the mobile terminal and to determine a forwarding destination of the packet, the mobile terminal comprising an algorithm specifying unit configured to specify, to the controller apparatus, an algorithm for forming the paging area of the mobile terminal; and a paging control unit configured to perform the paging control based on information on the paging area formed by the controller apparatus based on the algorithm.

In the second aspect of the present invention, a processing language specifying unit configured to specify, to the controller apparatus, a processing language in which an algorithm for forming the paging area is written may be included; and the algorithm specifying unit may be configured to specify the algorithm written in the processing language when a result of determination that the processing language can be handled is received from the controller apparatus.

A third aspect of the present invention is summarized as a controller apparatus configured to implement paging control in which, when the controller apparatus receives a packet addressed to a mobile terminal, the controller apparatus transmits a paging notification packet to a paging area of the mobile terminal, so as to obtain location information on the mobile terminal and to determine a forwarding destination of the packet, the controller apparatus comprising an algorithm specifying unit configured to specify, to the mobile terminal, an algorithm for forming the paging area of the mobile terminal; and a paging control unit configured to perform the paging control based on the paging area formed by the mobile terminal based on the algorithm.

In the third aspect of the present invention, a processing language specifying unit configured to specify, to the mobile terminal, a processing language in which an algorithm for forming the paging area is written may be included; and the algorithm specifying unit may be configured to specify the algorithm written in the processing language when a result of determination that the processing language can be handled is received from the mobile terminal.

A fourth aspect of the present invention is summarized as a mobile terminal configured to implement paging control in which, when a controller apparatus receives a packet addressed to a mobile terminal, the controller apparatus transmits a paging notification packet to a paging area of the mobile terminal, so as to obtain location information on the mobile terminal and to determine a forwarding destination of the packet, the mobile terminal comprising a paging area forming unit having a plurality of algorithms for forming the paging area; wherein the paging area forming unit is configured to form the paging area of the mobile terminal by an algorithm specified by the controller apparatus.

In the fourth aspect of the present invention, the paging area forming unit may be configured to form the paging area of the mobile terminal in accordance with a communicating use or movement characteristics of the mobile terminal.

A fifth aspect of the present invention is summarized as a mobile terminal configured to implement paging control in which, when a controller apparatus receives a packet addressed to a mobile terminal, the controller apparatus transmits a paging notification packet to a paging area of the mobile terminal, so as to obtain location information on the mobile terminal and to determine a forwarding destination of the packet, the mobile terminal comprising a paging area forming unit having algorithms for forming the paging area; and a transmitting unit configured to transmit, to the controller apparatus, information on the paging area formed by the paging area forming unit; wherein, when information on the paging area different from the information on the paging area formed by the paging area forming unit is received from the controller apparatus, the transmitting unit is configured to transmit, to a different controller apparatus, the information on the paging area formed by the paging area forming unit.

BRIEF DESCRIPTION OF DRAWINGS

FIGS. 3(a) and 3(b) are diagrams for illustrating examples of algorithms according to the first embodiment of the present invention;

FIG. 10 is a sequence diagram showing operation of the mobile node and paging agents according to the third embodiment of the present invention.

BEST MODE FOR CARRYING OUT THE INVENTION (Configuration of First Embodiment of the Invention)

Figure 1:
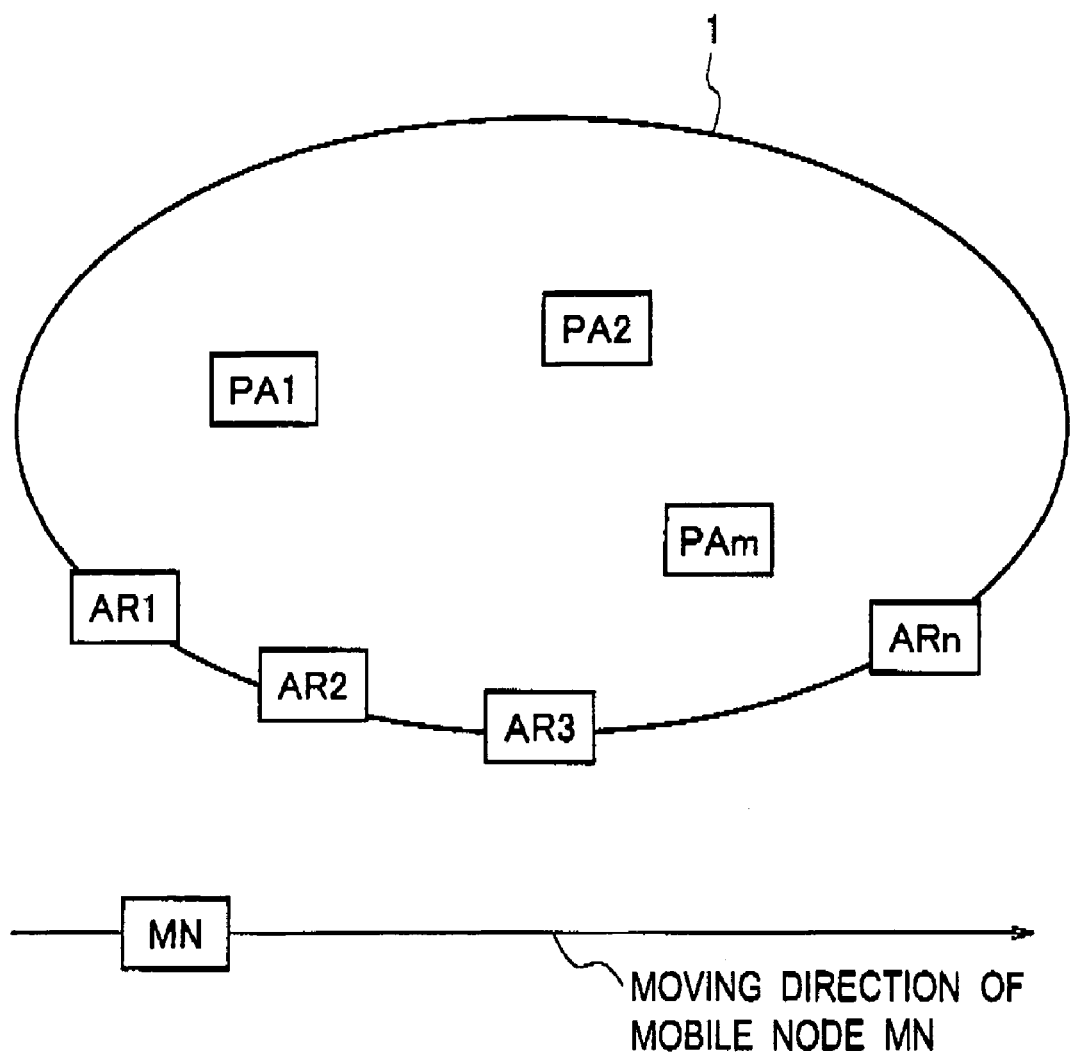
FIG. 1 is a diagram for illustrating an overview of an IP network according to an embodiment of the present invention.

With reference to FIGS. 1 to 5, a first embodiment of the present invention will be described. FIG. 1 is a diagram for illustrating an overview of an IP network according to this embodiment.

As shown in FIG. 1, a mobile node MN as a mobile terminal, a plurality of access routers AR1 to ARn, and a plurality of paging agents PA1 to PAm as controller apparatuses are located in an IP network 1 according to this embodiment.

Suppose that different mobile communications systems and wire communications systems are included in the IP network 1 of this embodiment. That is, the paging agents PA1 to PAm in this embodiment manage routing information on the mobile node MN by an IP layer in which a subnet prefix, IP address or the like is used, and therefore they can manage a mobile node MN subscribing to different mobile communications systems and wire communications systems, with the same framework.

In the IP network 1 of this embodiment, when a paging agent PA receives packets addressed to a certain mobile node MN, paging control is performed in which it transmits a paging notification packet to a paging area of the mobile node MN, thereby obtaining location information (e.g., subnet prefix or IP address) on the mobile node MN and determining a forwarding destination of the packets.

The mobile node MN of this embodiment moves in a moving direction shown in FIG. 1, and is configured not to perform location registration when operating in paging control mode and moving across location registration areas managed by access points (e.g., base stations), respectively, which are connected to the access routers AR1 to ARn.

Figure 2:
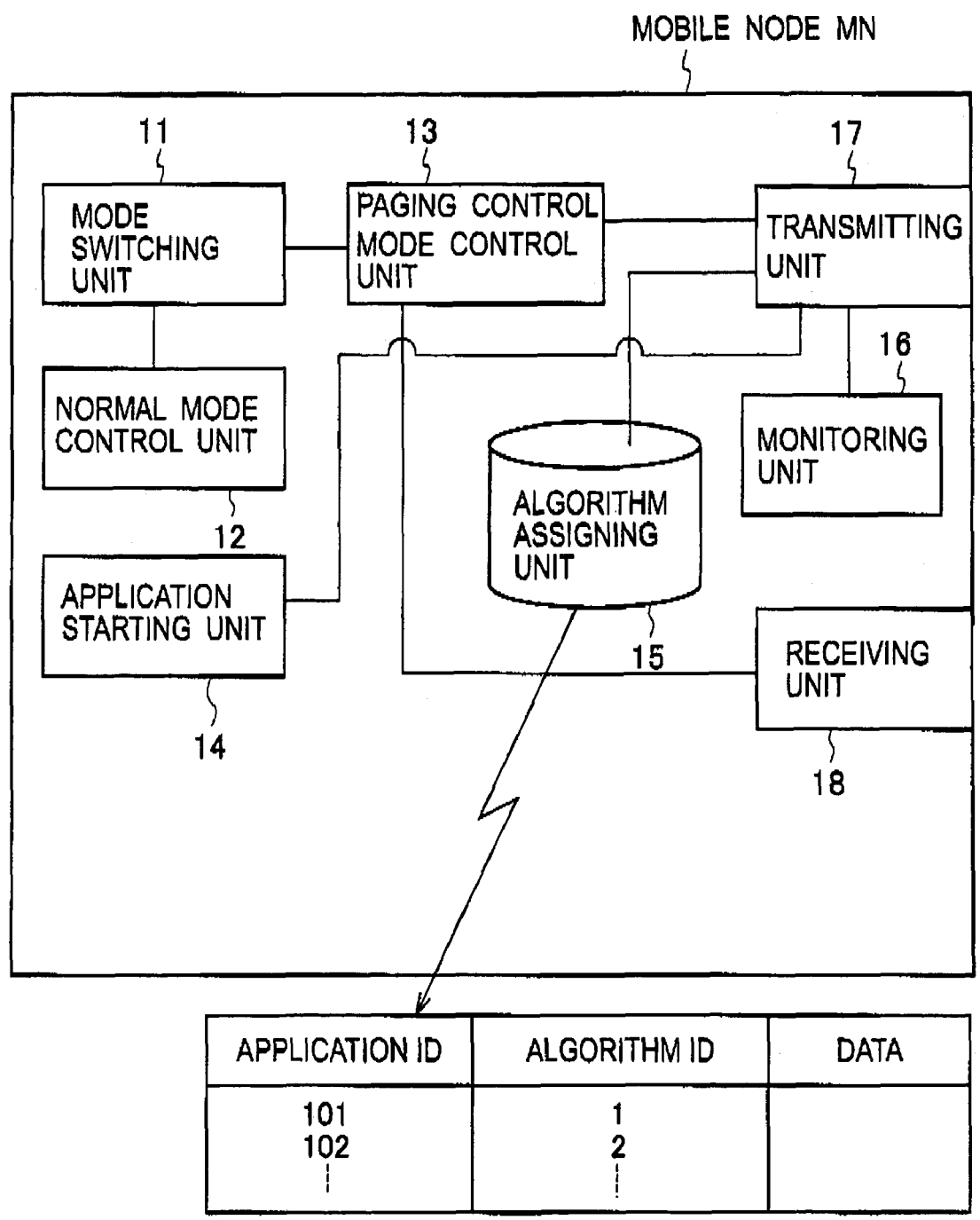
FIG. 2 is a functional block diagram of a mobile node according to a first embodiment of the present invention.

As shown in FIG. 2, the mobile node MN is provided with a mode switching unit 11, a normal mode control unit 12, a paging control mode control unit 13, an application starting unit 14, an algorithm assigning unit 15, a monitoring unit 16, a transmitting unit 17, and a receiving unit 18, as functions according to the present invention.

The mode switching unit 11 is configured to switch the mobile node MN to operation in normal mode or to operation in paging control mode, in accordance with an instruction from a user of the mobile node MN or the like.

The mode switching unit 11 is also configured to switch the mobile node MN from the state of operating in paging control mode to the state to operate in normal mode, when a paging notification packet is received.

The normal mode control unit 12 is configured to control functions of the mobile node MN for operation in normal mode. For example, in normal mode, the mobile node MN is configured to perform a mobility management operation by "Mobile IF" or an extended method thereof.

The paging control mode control unit 13 is configured to control functions of the mobile node MN for operation in paging control mode. For example, in paging control mode, the mobile node MN is configured to stop the mobility management operation; and to register a paging area of the mobile node MN with a paging agent PA. The paging control mode control unit 13 also has the function of determining whether it is located in a paging area or not.

The paging control mode control unit 13 is also configured to start paging control in accordance with area information included in a paging registration response packet transmitted from a paging agent PA through the receiving unit 18.

When the paging control mode control unit 13 does not agree to a paging area communicated by a paging registration response packet transmitted from a paging agent PA, it may instruct the transmitting unit 17 to transmit a paging registration request packet to a different paging agent PA or the same paging agent PA once again.

The application starting unit 14 is configured to start various applications (e.g., an e-mail application and so on) on the mobile node MN.

The algorithm assigning unit 15 is configured to associate and store "application IDs", "algorithm IDs" and "data".

The "application IDs" are identifiers of applications which are started by the application starting unit 14. The "algorithm IDs" are identifiers of algorithms for forming a paging area of the mobile node MN. The "algorithm IDs" may include identifiers of paging agents which hold the corresponding algorithms, in addition to the identifiers of the algorithms. The "data" is data (e.g., movement characteristics of the mobile node MN or the like) required for calculation by the algorithms.

That is, the algorithm assigning unit 15 defines what algorithm to use for forming a paging area of the mobile node MN, when a certain application is started by the application starting unit 14.

Examples of the algorithms include ones to form a paging area at the initiative of the user side and ones to form a paging area at the initiative of the network side.

An algorithm to form a paging area at the initiative of the user side may be one to select a paging area fixedly set as shown in FIG. 3(*a*), based on current location information on the mobile node MN, for example. Here, the "current location information" may be location information calculated from an access point with which the mobile node MN is communicating, or may be location information on latitude and longitude determined by GPS or the like. The "paging area" may be formed by a plurality of location registration areas, for example.

Another algorithm to form a paging area at the initiative of the user side may be one to estimate a future paging area based on a movement history of the mobile node, for example. Such an algorithm may use a "movement history" monitored by the monitoring unit 16 as the movement history of the mobile node MN.

Another algorithm to form a paging area at the initiative of the user side may be one to form a paging area based on a schedule preset by a user, for example. As shown in FIG. 3(*b*), for example, such an algorithm can associate and store "times" and "paging areas", thereby to uniquely determine a paging area at a given time. When such an algorithm is used, a user can preset paging areas according to a time at which he is usually at home and a time at which he is usually at the workplace.

An algorithm to form a paging area at the initiative of the network side may be one to variably form a paging area in consideration of a sudden increase/decrease in traffic under each paging agent PA, for example.

Another algorithm to form a paging area at the initiative of the network side may be one to variably form a paging area in consideration of distribution of a communication type (e.g., real-time communication, non-real-time communication or the like) of mobile nodes MN under each paging agent PA, for example.

The monitoring unit 16 is configured to monitor the movement characteristics of the mobile node MN. Specifically, the monitoring unit 16 monitors statistics including the "number of state transitions", the "continuation length" and the "movement history" of the mobile node MN.

Here, the "number of state transitions" indicates the number of times the mobile node MN has performed mode switching between normal mode and paging control mode, the number of times it has moved across location registration areas, or the like.

The "continuation length" indicates a time for which the mobile node MN continues operating in a current mode (normal mode or paging control mode), a time for which it continues being located in a current location registration area, or the like.

The "movement history" indicates access points (e.g., base stations) which the mobile node MN went through, location information on the mobile node MN determined by GPS, the movement speed of the mobile node MN, or the like.

The transmitting unit 17 constitutes a specifying unit configured to specify an algorithm for forming a paging area of the mobile node MN to a paging agent PA.

Specifically, when the transmitting unit 17 is notified that paging control mode has been started by the paging control mode control unit 13, it transmits a paging registration request packet including an algorithm identifier (algorithm ID) to a paging agent PA, thereby specifying an algorithm for forming a paging area of the mobile node MN.

Here, the transmitting unit 17 may be configured to select an algorithm for forming a paging area of the mobile node MN in accordance with a communicating use of the mobile node MN. That is, the transmitting unit 17 may be configured to select an algorithm associated, at the algorithm assigning unit 15, with an application which has been started by the application starting unit 14, as an algorithm for forming a paging area of the mobile node MN.

Also, the transmitting unit 17 may be configured to select an algorithm for forming a paging area of the mobile node MN in accordance with the movement characteristics of the mobile node MN. That is, the transmitting unit 17 may be configured to refer to statistics of the "number of state transitions", "continuation length" and "movement history" monitored by the monitoring unit 16, so as to select an optimum algorithm for forming a paging area of the mobile node MN.

When it is desired to form a paging area by an algorithm preset at a paging agent PA, the transmitting unit 17 may transmit a paging registration request packet including that instruction, or may transmit a paging registration request packet not including a specific algorithm ID.

The receiving unit 18 is configured to receive a paging registration response packet including area information on a paging area formed by a paging agent PA, and a paging notification packet showing the arrival of packets addressed to the mobile node MN. The receiving unit 18 is configured to notify the paging control mode control unit 13 of area information included in a paging registration response packet.

Figure 4:
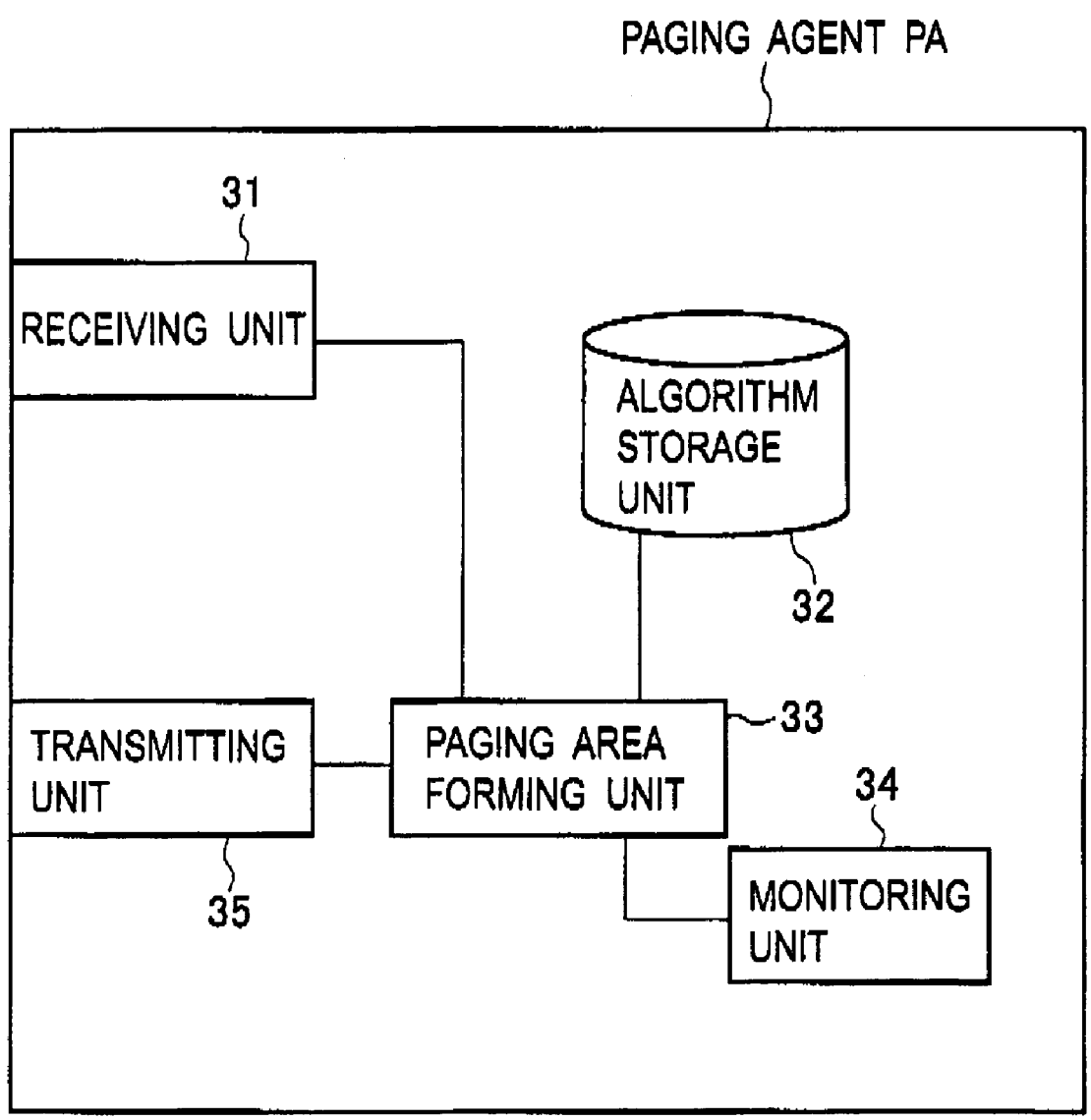
FIG. 4 is a functional block diagram of a paging agent according to the first embodiment of the present invention.

As shown in FIG. 4, a paging agent PA is provided with a receiving unit 31, an algorithm storage unit 32, a paging area forming unit 33, a monitoring unit 34, and a transmitting unit 35, as functions according to the present invention.

The receiving unit 31 is configured to receive various packets such as a paging registration request packet transmitted from a mobile node MN.

The algorithm storage unit 32 is configured to store a plurality of algorithms for forming a paging area of a mobile node MN. Specifically, the algorithm storage unit 32 associates and stores algorithm IDs and algorithms.

The algorithm storage unit 32 also stores a certain algorithm used when an algorithm specified by a mobile node MN is not there, or in a like case. For example, the algorithm storage unit 32 may store a certain algorithm according to load conditions (or traffic distribution) of the paging agent PA.

The algorithm storage unit 32 may be configured to store a unique topology of access routers AR, and set, as the certain algorithm, an algorithm which sets a list of the access routers AR constituting the topology as a paging area.

The paging area forming unit 33 is configured to form a paging area of a mobile node MN by an algorithm specified by the mobile node MN.

Specifically, the paging area forming unit 33 extracts, from the algorithm storage unit 32, an algorithm identified by an algorithm ID included in a paging registration request packet received by the receiving unit 31, and uses the extracted algorithm and data included in the paging registration request packet, so as to form a paging area of the mobile node MN.

When the algorithm identified by the algorithm identifier included in the paging registration request packet is not in the algorithm storage unit 32, the paging area forming unit 33 may use the certain algorithm and data which the paging agent PA itself implements, to form a paging area of the mobile node MN, and notify the mobile node MN of the result (area information) by a paging registration response packet.

In this case, the paging area forming unit 33 may notify the mobile node MN that it refuses to form a paging area by the algorithm specified by the mobile node MN.

Also, when a specific algorithm ID is not included in the paging registration request packet, or when it is instructed in the paging registration request packet to form a paging area by an algorithm preset at the paging agent PA, the paging area forming unit 33 may use the certain algorithm and data which the paging agent PA itself implements, to form a paging area of the mobile node MN, and notify the mobile node MN of the result by a paging registration response packet.

The paging area forming unit 33 may also be configured to form a paging area of a mobile node MN, in accordance with the load conditions (or traffic distribution) of the paging agent PA monitored by the monitoring unit 34.

For example, when the number of mobile nodes MN managed by the paging agent PA or the number of transmission of paging signals exceeds a certain level, the paging area forming unit 33 may reject an algorithm which has been allowed until that moment and use a preset algorithm, thereby making a paging area smaller, so as to promptly make a mobile node MN in standby mode into active mode.

The monitoring unit 34 is configured to monitor the load conditions (or traffic distribution) of the paging agent PA.

The transmitting unit 35 is configured to transmit a paging registration response packet including area information on a paging area formed by the paging area forming unit 33 to a mobile node MN.

The paging agent PA also has the function of transmitting a paging notification packet to a paging area of a certain mobile node MN when it receives packets addressed to the mobile node MN.

(Operation of First Embodiment of the Invention)

Figure 5:
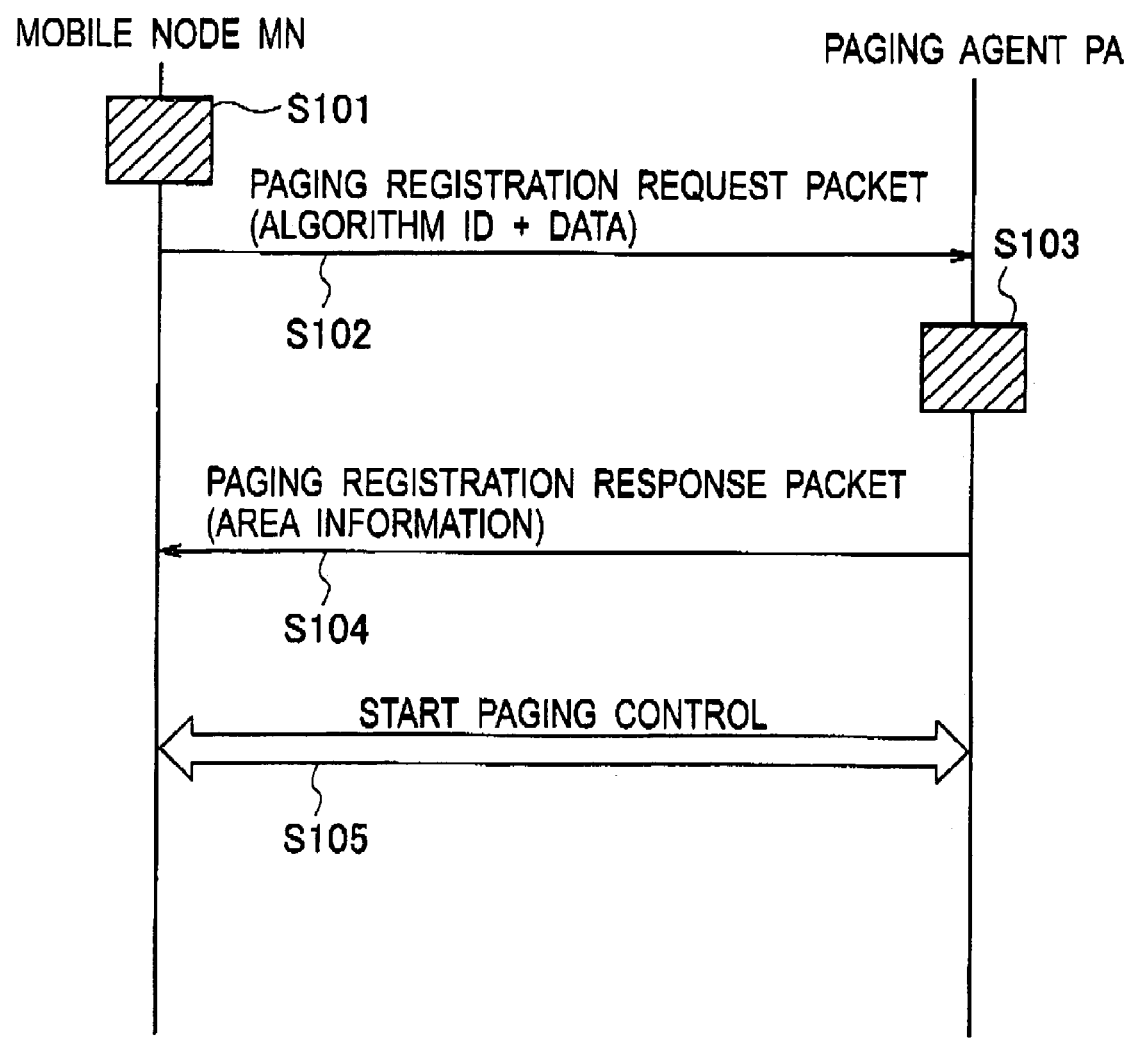
FIG. 5 is a sequence diagram showing operation of the mobile node and the paging agent according to the first embodiment of the present invention.

With reference to FIG. 5, an operation to start paging control between a mobile node MN and a paging agent PA according to this embodiment will be described.

As shown in FIG. 5, in step 101, the paging control mode control unit 13 of the mobile node MN detects switching of the operation mode of the mobile node MN to paging control mode.

In step 102, the transmitting unit 17 of the mobile node MN transmits a paging registration request packet including an algorithm ID and data selected in a predetermined way to the paging agent PA.

In step 103, the paging area forming unit 33 of the paging agent PA uses an algorithm specified by the algorithm ID included in the paging registration request packet, and forms a paging area of the mobile node MN.

In step 104, the transmitting unit 35 of the paging agent PA transmits a paging registration response packet including area information on the paging area formed by the paging area forming unit 33 to the mobile node MN.

In step 105, the paging control mode control unit 13 of the mobile node MN starts operation in paging control mode based on the area information included in the received paging registration response packet.

(Effects of First Embodiment of the Invention)

According to this embodiment, a paging agent PA can form a paging area of a mobile node MN, by an optimum algorithm selected in accordance with a communicating use or movement characteristics of the mobile node MN.

Also, according to this embodiment, the transmitting unit 17 of the mobile node MN can specify an optimum algorithm from among public algorithms implemented at a paging agent PA, thereby facilitating formation of a paging area in accordance with a communicating use or movement characteristics of the mobile node MN.

(Modification 1)

A configuration where functions of the mobile node MN and functions of the paging agent PA according to the above-described first embodiment are interchanged as will be described below is also possible.

Specifically, a paging agent PA according to modification 1 is provided with a specifying unit configured to specify an algorithm for forming a paging area of a mobile node MN to the mobile node MN, and a paging area forming unit configured to form a paging area of the mobile node MN based on information on a paging area transmitted from the mobile node MN.

On the other hand, a mobile node MN according to the modification 1 is provided with a paging area forming unit having a plurality of algorithms for forming a paging area of the mobile node MN. The paging area forming unit is configured to form a paging area of the mobile node MN by an algorithm specified by a paging agent PA.

(Configuration of Second Embodiment of the Invention)

Figure 6:
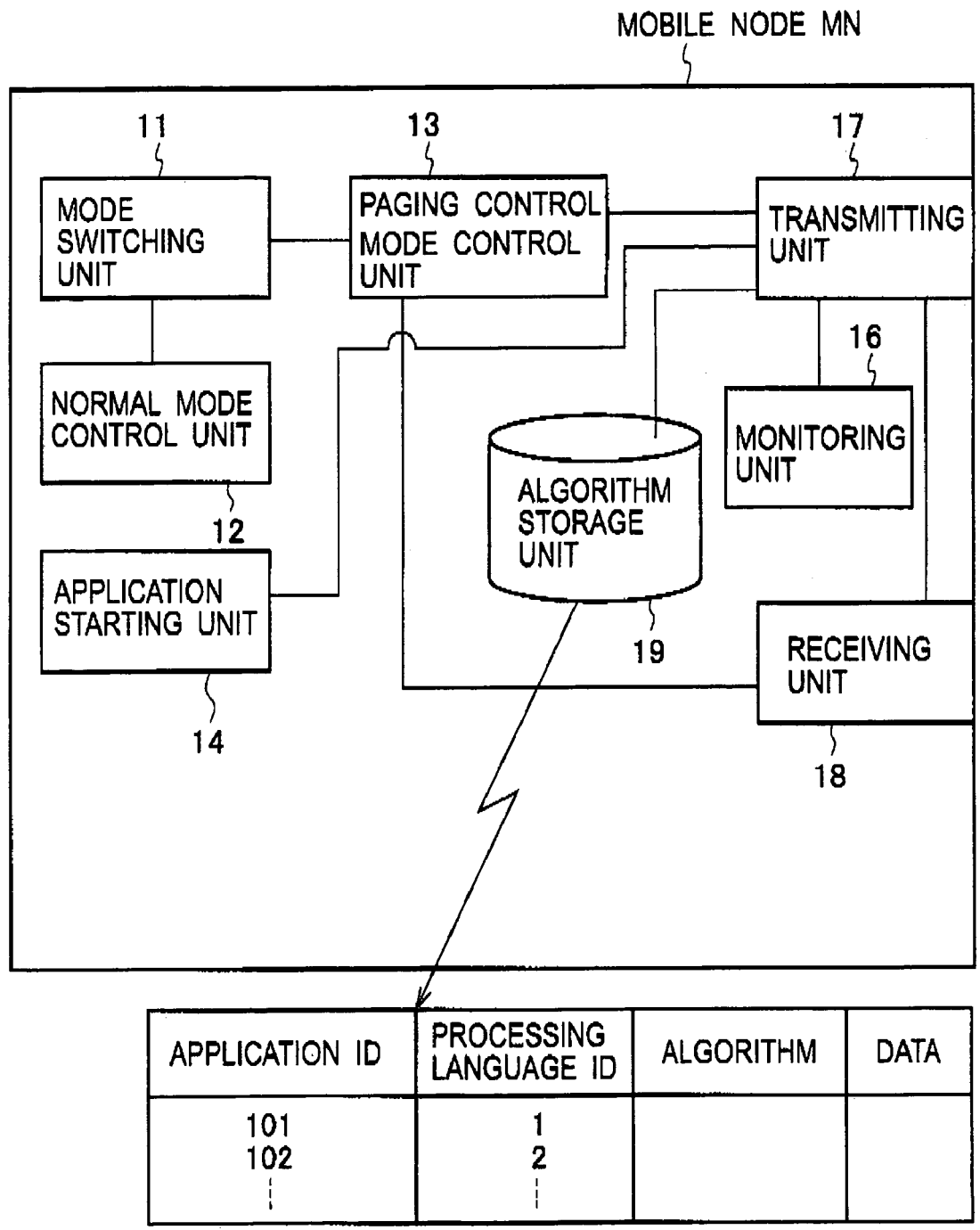
FIG. 6 is a functional block diagram of a mobile node according to a second embodiment of the present invention.
Figure 7:
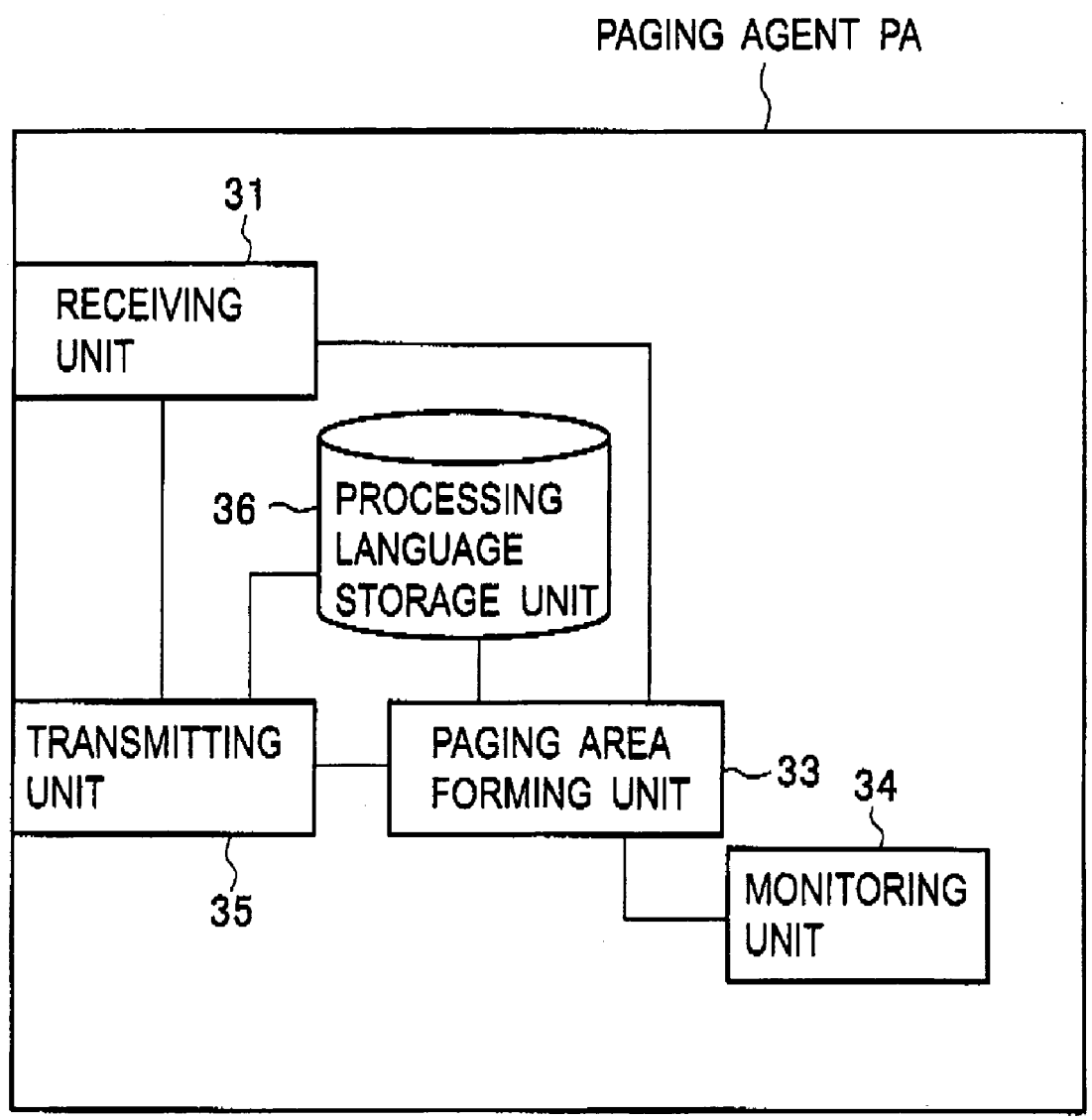
FIG. 7 is a functional block diagram of a paging agent according to the second embodiment of the present invention.
Figure 8:
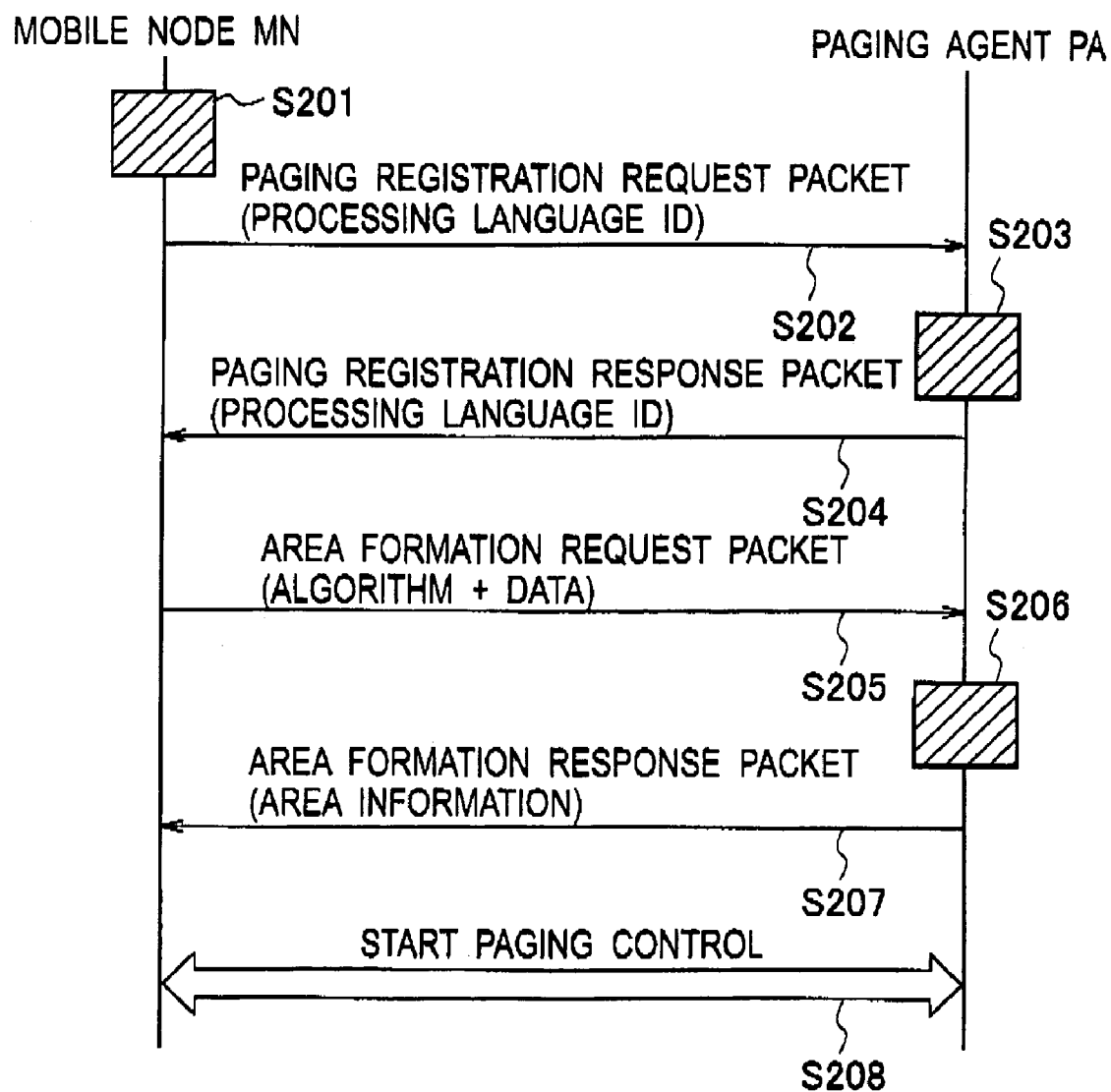
FIG. 8 is a sequence diagram showing operation of the mobile node and the paging agent according to the second embodiment of the present invention.

With reference to FIGS. 6 to 8, a second embodiment of the present invention will be described. Hereinafter, differences of this embodiment from the first embodiment will be described mainly.

As shown in FIG. 6, a mobile node MN according to this embodiment has the same configuration as that of the mobile node MN according to the first embodiment, except for inclusion of an algorithm storage unit 19 instead of an algorithm assigning unit 15, and the functions of a paging control mode control unit 13, a transmitting unit 17 and a receiving unit 18.

The algorithm storage unit 19 is configured to associate and store "application IDs", "processing language IDs", "algorithms" and "data".

The "application IDs" are identifiers of applications which are started by an application starting unit 14. The "processing language IDs" are identifiers of processing languages in which algorithms are written. The "algorithms" are algorithms for forming a paging area of the mobile node MN. The "data" is data required for calculation by the algorithms (e.g., the movement characteristics of the mobile node MN or the like).

The transmitting unit 17 according to this embodiment constitutes a specifying unit configured to specify a processing language in which an algorithm is written, to a paging agent PA. Specifically, when the transmitting unit 17 is notified that paging control mode has been started by the paging control mode control unit 13, it transmits a paging registration request packet including a processing language ID to a paging agent PA.

The transmitting unit 17 may be configured to select a processing language of an algorithm for forming a paging area of the mobile node MN in accordance with a communicating use of the mobile node MN. That is, the transmitting unit 17 may be configured to select an algorithm processing language associated, at the algorithm storage unit 19, with an application which has been started by the application starting unit 14.

The transmitting unit 17 may also be configured to select an algorithm processing language according to the movement characteristics of the mobile node MN. That is, the transmitting unit 17 may be configured to select an optimum algorithm processing language, referring to statistics of the "number of state transitions", "continuation length" and "movement history" monitored by a monitoring unit 16.

When it is desired to form a paging area by an algorithm preset at a paging agent PA, the transmitting unit 17 may transmit a paging registration request packet including that instruction, or may transmit a paging registration request packet not including a specific processing language ID.

When there is a notification from the paging agent PA that a processing language communicated by the paging registration request packet can be handled, the transmitting unit 17 transmits an algorithm written in the processing language to the paging agent PA.

Specifically, the transmitting unit 17 extracts, from the algorithm storage unit 19, an algorithm and data associated with the processing language ID included in a paging registration response packet received by the receiving unit 18, and transmits an area formation request packet including the extracted algorithm and data to the paging agent PA.

The receiving unit 18 according to this embodiment is configured to receive an area formation response packet including area information on a paging area formed by a paging agent PA, a paging registration response packet including a processing language ID, and a paging notification packet showing the arrival of packets addressed to the mobile node MN. The receiving unit 18 is also configured to notify the paging control mode control unit 13 of area information included in a paging registration response packet.

The paging control mode control unit 13 according to this embodiment is configured to start paging control in accordance with area information included in an area formation response packet transmitted from a paging agent PA through the receiving unit 18.

As shown in FIG. 7, a paging agent PA according to this embodiment has the same configuration as that of the paging agent PA according to the first embodiment, except for inclusion of a processing language storage unit 36 instead of an algorithm storage unit 32, and the function of a paging area forming unit 33.

The processing language storage unit 36 is configured to store processing languages which can be handled at the paging agent PA.

The paging area forming unit 33 according to this embodiment has the function of determining whether a processing language specified by a mobile node MN is handled or not, specifically, whether a processing language identified by a processing language ID included in a paging registration request packet transmitted from a mobile node MN is in the processing language storage unit 36 or not.

Here, the paging area forming unit 33 transmits, to the mobile node MN, a paging registration response packet showing that algorithm transmission is allowed when it determines that the processing language can be handled, or a paging registration response packet showing that algorithm transmission is not allowed when it determines that the processing language cannot be handled.

When the paging registration request packet does not include a certain processing language ID, or when it is instructed in the paging registration request packet to form a paging area by an algorithm written in a processing language preset at the paging agent PA, the paging area forming unit 33 may transmit a paging registration response packet including a processing language which the paging agent PA itself can handle to the mobile node MN.

The paging area forming unit 33 may be configured to transmit, to a mobile node MN, a paging registration response packet including a processing language ID indicating a processing language different from a processing language specified by the mobile node MN.

The paging area forming unit 33 forms a paging area of a mobile node MN by an algorithm transmitted from the mobile node MN. Specifically, the paging area forming unit 33 uses an algorithm and data included in an area formation request packet received by a receiving unit 31, and forms a paging area of the mobile node MN.

The paging area forming unit 33 may also be configured to use a certain algorithm and data which the paging agent PA itself implements instead of an algorithm transmitted from a mobile node MN, to form a paging area of the mobile node MN, and notify the mobile node MN of the result (area information) by an area formation response packet.

In this case, the paging area forming unit 33 may be configured to notify the mobile node MN that it refuses to form a paging area by the algorithm and data transmitted from the mobile node MN.

When the area formation request packet does not include a specific algorithm and data, or when it is instructed in the area formation request packet to form a paging area by an algorithm preset at the paging agent PA, the paging area forming unit 33 may use a certain algorithm and data which the paging agent itself implements, to form a paging area of the mobile node MN, and notify the mobile node MN of the result by an area formation response packet.

For example, when the number of mobile nodes managed by the paging agent PA or the number of transmission of paging signals exceeds a certain level, the paging area forming unit 33 can reject an algorithm which has been allowed until that moment, and use a preset algorithm to make a paging area smaller, so as to promptly make a mobile node MN in standby mode into active mode.

(Operation of Second Embodiment of the Invention)

With reference to FIG. 8, an operation to start paging control between a mobile node MN and a paging agent PA according to this embodiment will be described.

As shown in FIG. 8, in step 201, the paging control mode control unit 13 of the mobile node MN detects switching of the operation mode of the mobile node MN to paging control mode.

In step 202, the transmitting unit 17 of the mobile node MN transmits a paging registration request packet including a processing language ID selected in a predetermined way to the paging agent PA.

In step 203, the paging area forming unit 33 of the paging agent PA determines whether the processing language ID included in the paging registration request packet is stored in the processing language storage unit 36 or not.

When it is determined that the processing language ID is stored, in step 204, the paging area forming unit 33 and the transmitting unit 35 of the paging agent PA transmit a paging registration response packet including the processing language ID to the mobile node MN.

On the other hand, when it is determined that the processing language ID is not stored, the paging area forming unit 33 and the transmitting unit 35 of the paging agent PA transmit, to the mobile node MN, a paging registration response packet including a processing language ID preset at the paging agent PA, or a paging registration response packet showing that algorithm transmission is not allowed.

In step 205, the transmitting unit 17 of the mobile node MN extracts an algorithm and data associated with the processing language ID included in the received paging registration response packet from the algorithm storage unit 19, and transmits an area formation request packet including the extracted algorithm and data to the paging agent PA.

When algorithm and data associated with the processing language ID included in the received paging registration response packet are not in the algorithm storage unit 19, the transmitting unit 17 of the mobile node MN transmits the paging registration request packet to a different paging agent, or transmits a paging registration request packet including a different processing language ID to the same paging agent again.

In step 206, the paging area forming unit 33 of the paging agent PA uses the algorithm and data included in the area formation request packet, so as to form a paging area of the mobile node MN.

In step 207, the transmitting unit 35 of the paging agent PA transmits an area formation response packet including area information on the paging area formed by the paging area forming unit 33 to the mobile node MN.

In step 208, the paging control mode control unit 13 of the mobile node MN starts operation in paging control mode, based on the area information included in the received area formation response packet.

(Effects of Second Embodiment of the Invention)

According to this embodiment, since a paging agent PA forms a paging area in accordance with an algorithm and data transmitted from a mobile node MN, a paging area can be formed finely in accordance with a communicating use or movement characteristics of the mobile node MN without increasing an implementation load of the paging agent PA.

Also, according to this embodiment, since a mobile node MN can freely generate an algorithm in a processing language which can be handled at a paging agent PA, a paging area can be finely formed in accordance with a communicating use or movement characteristics of the mobile node MN.

(Modification 2)

A configuration where functions of the mobile node MN and functions of the paging agent PA according to the above-described second embodiment are interchanged as will be described below is also possible.

Specifically, a paging agent PA according to modification 2 is provided with a specifying unit configured to specify, to a mobile node MN, a processing language in which an algorithm for forming a paging area is written, a transmitting unit configured to transmit, to the mobile node MN, an algorithm written in the processing language when a result of determination that the processing language can be handled is received from the mobile node MN, and a paging area forming unit configured to form a paging area of the mobile node MN by the algorithm.

On the other hand, a mobile node MN according to the modification 2 is provided with a determination result transmitting unit configured to transmit a result of determination of whether a processing language specified by a paging agent PA can be handled or not, and a paging area forming unit configured to form a paging area of the mobile node MN by an algorithm written in a processing language it can handle and transmitted from the paging agent PA according to the result of the determination.

(Configuration of Third Embodiment of the Invention)

Figure 9:
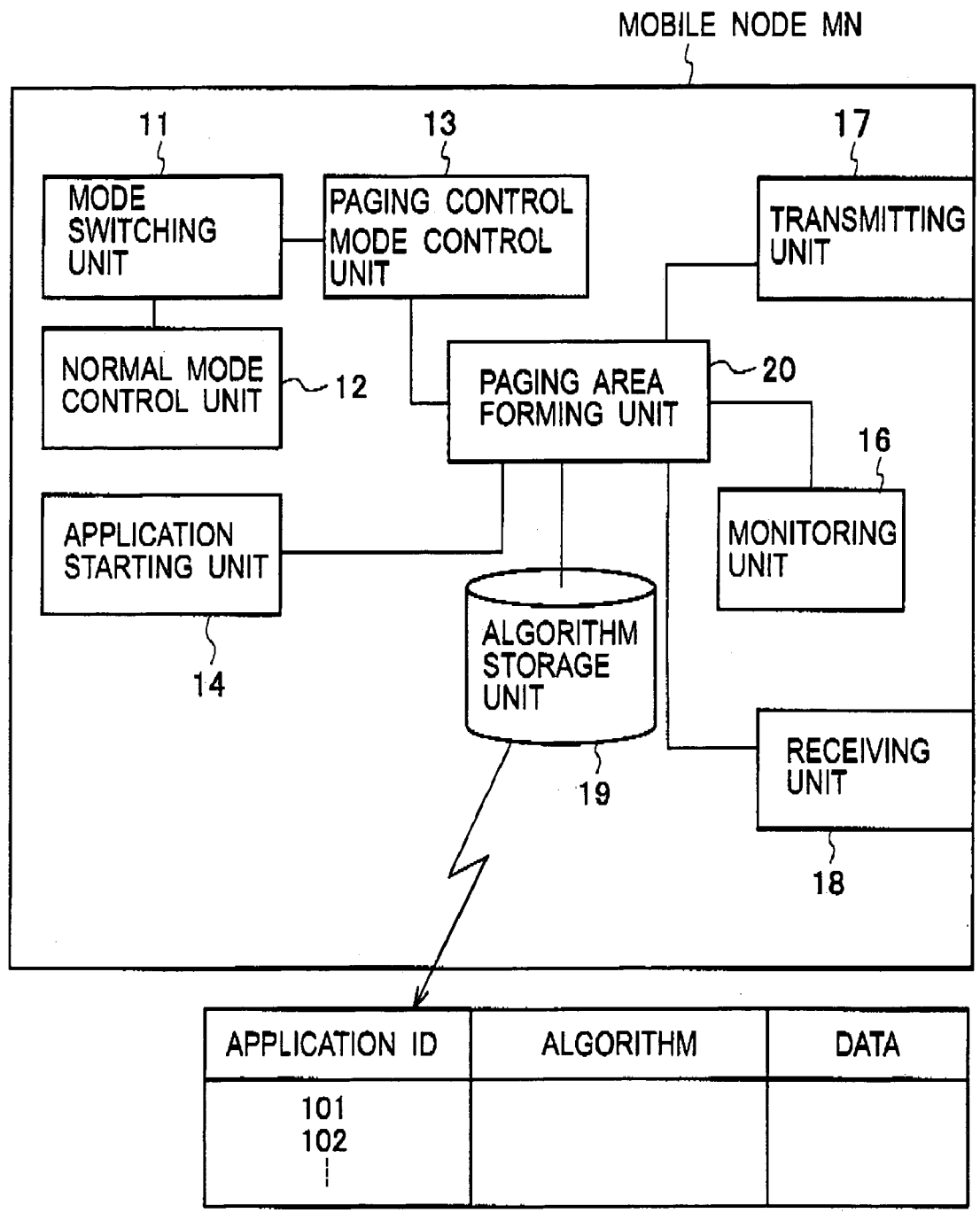
FIG. 9 is a functional block diagram of a mobile node according to a third embodiment of the present invention.

With reference to FIGS. 9 to 10, a third embodiment of the present invention will be described. Hereinafter, differences of this embodiment from the first embodiment will be described mainly.

As shown in FIG. 9, a mobile node MN according to this embodiment has the same configuration as that of the mobile node MN according to the first embodiment, except for inclusion of an algorithm storage unit 19 and a paging area forming unit 20, and the function of a transmitting unit 17.

The algorithm storage unit 19 is configured to associate and store "application IDs", "algorithms" and "data".

The paging area forming unit 20 is configured to select an algorithm for forming a paging area of the mobile node MN in accordance with a communicating use of the mobile node MN when notified that paging control mode has been started by a paging control mode control unit 13.

Specifically, the paging area forming unit 20 selects an algorithm associated, at the algorithm storage unit 19, with an application which has been started by an application starting unit 14, as an algorithm for forming a paging area of the mobile node MN.

The paging area forming unit 20 also forms a paging area of the mobile node MN by a selected algorithm, and transmits a paging registration request packet including information (area information) on the formed paging area to a paging agent PA through the transmitting unit 17.

The paging area forming unit 20 also forms a paging area of the mobile node MN based on information on a paging area transmitted from a paging agent PA.

Specifically, when the paging area forming unit 20 is satisfied with a paging area shown by area information included in a paging registration response packet transmitted from a paging agent PA, it notifies the paging control mode control unit 13 of the paging area as the paging area of the mobile node MN.

On the other hand, when the paging area forming unit 20 is not satisfied with a paging area shown by area information included in a paging registration response packet transmitted from a paging agent PA, it transmits a paging registration request packet including the same area information to a different paging agent PA, or transmits a paging registration request packet including information (area information) on a paging area generated by a different algorithm to the same paging agent PA.

For example, when the mobile node MN has a high possibility of being located in a certain route such as a commuting route, the paging area forming unit 20 may form an efficient paging area by an algorism which collects a list of subnet prefixes or IP addresses under access routers AR which manage the certain route, or the like.

When the mobile node MN is a wireless IC tag attached to a commodity or the like, the movement characteristics of the mobile node MN greatly differ depending on scenes where it is transported from a factory to a store, displayed in the store, moved from the store to a consumer, used by a consumer, and so on. Therefore, the paging area forming unit 20 may execute an algorithm to reduce the paging area to lower a paging signal (paging notification packet) transmission load of a paging agent PA when movement of the mobile node MN is not detected for a certain period of time, and to enlarge the paging area to reduce unnecessary execution of a paging area update procedure when high-speed movement of the mobile node MN is detected.

The paging agent PA according to this embodiment has the same configuration as that of the paging agent PA according to the first embodiment, except for the function of the paging area forming unit 33.

The paging area forming unit 33 selects an optimum paging area, based on a paging area A shown by area information included in a paging registration request packet transmitted from a mobile node MN, or a paging area B formed by the paging area forming unit 33. The paging area forming unit 33 then transmits information on a selected paging area to the mobile node MN as a paging registration response packet through a transmitting unit 35.

Specifically, the paging area forming unit 33 may be configured to select, as an optimum paging area, a paging area as the logical sum or logical product of the paging area A and the paging area B.

The paging area forming unit 33 may alternatively be configured to select an optimum paging area, based on the paging area A, by increasing or reducing a paging area, depending on traffic distribution (load conditions) within the paging area A.

The paging area forming unit 33 may alternatively be configured to select the paging area B as an optimum paging area regardless of the paging area A.

(Operation of Third Embodiment of the Invention)

With reference to FIG. 10, an operation to start paging control between a mobile node MN and a paging agent PA according to this embodiment will be described.

As shown in FIG. 10, in step 301, the paging control mode control unit 13 of the mobile node MN detects switching of the operation mode of the mobile node MN to paging control mode. Then, the paging area forming unit 20 of the mobile node MN selects a certain algorithm from among algorithms stored in the algorithm storage unit 19, and forms a paging area of the mobile node MN by the selected algorithm.

In step 302, the transmitting unit 17 of the mobile node MN transmits a paging registration request packet including information (area information A) on the formed paging area to a paging agent PA1.

In step 303, a paging area forming unit 33 of the paging agent PA1 forms an optimum paging area of the mobile node MN, based on the paging area A shown by the area information A included in the paging registration request packet, or a paging area B formed by the paging area forming unit 33.

In step 304, the transmitting unit 35 of the paging agent PA1 transmits a paging registration response packet including area information B on the paging area formed by the paging area forming unit 33 to the mobile node MN.

In step 305, the paging area forming unit 20 of the mobile node MN determines that it is not satisfied with the paging area shown by the area information B, and transmits a paging registration request packet including the area information A to a paging agent PA2.

In step 306, a paging area forming unit 33 of the paging agent PA2 forms an optimum paging area of the mobile node MN, based on the paging area A shown by the area information A included in the paging registration request packet, or a paging area C formed by the paging area forming unit 33.

In step 307, a transmitting unit 35 of the paging agent PA2 transmits a paging registration response packet including area information C on the paging area formed by the paging area forming unit 33 to the mobile node MN.

In step 308, the paging area forming unit 20 of the mobile node MN determines that it is satisfied with the paging area shown by the area information C, and the paging control mode control unit 13 of the mobile node MN starts operation in paging control mode based on the area information C included in the received paging registration response packet.

(Effects of Third Embodiment of the Invention)

According to this embodiment, when a mobile node MN is satisfied with a paging area formed by a paging agent PA by a certain algorithm, the paging area is used, and thus formation of a paging area in consideration of a communicating use and movement characteristics of the mobile node MN can be performed.

In addition, according to this embodiment, when a mobile node MN determines that a paging area formed by a certain paging agent PA is not desirable, it can use a paging area formed by a different paging agent PA.

(Modification 3)

A configuration where functions of the mobile node MN and functions of the paging agent PA according to the above-described third embodiment are interchanged as will be described below is also possible.

Specifically, a mobile node MN according to modification 3 is provided with a paging area forming unit having algorithms for forming a paging area, and a transmitting unit configured to transmit, to a paging agent PA, information on a paging area selected based on a paging area transmitted from the paging agent PA, or a paging area formed by the paging area forming unit.

On the other hand, a paging agent PA according to the modification 3 is provided with a paging area forming unit having algorithms for forming a paging area, and a transmitting unit configured to transmit information on a paging area formed by the paging area forming unit to a mobile node MN; and the paging area forming unit is configured to form a paging area of a mobile node MN based on information on a paging area transmitted from the mobile node MN.

(Others)

Programs for serving as mobile nodes MN and paging agents PA according to the above-described first to third embodiments and modifications 1 to 3 may be supplied through a telecommunication line.

The programs allow a general mobile terminal and server device to serve as a mobile node MN and a paging agent PA according to the present invention, respectively.

Although the present invention has been described in detail above with the embodiments, it is obvious to those skilled in the art that the present invention is not limited to the embodiments described in this application. The devices in the present invention can be implemented with alterations and modifications without departing from the spirit and scope of the present invention defined by the description of the claims. Thus, the description in this application is for illustrative purposes, and is not meant to limit the present invention.

INDUSTRIAL APPLICABILITY

According to the present invention, a controller apparatus and a mobile terminal can be provided which enable formation of an optimum paging area in accordance with a communicating use or movement characteristics of the mobile terminal by cooperation between the controller apparatus and the mobile terminal.

The invention claimed is:

1. A controller apparatus configured to implement paging control in which, when the controller apparatus receives a packet addressed to a mobile terminal, the controller apparatus transmits a paging notification packet to a paging area of the mobile terminal, so as to obtain location information on the mobile terminal and to determine a forwarding destination of the packet, the controller apparatus comprising:
   a processing language storing unit configured to store processing languages which can be handled at the controller apparatus;
   a receiving unit configured to receive from the mobile terminal a processing language in which an algorithm for forming the paging area is written;
   a paging area forming unit configured to determine whether the processing language received from the mobile terminal is stored in the process language storing unit; and
   a transmitting unit configured to transmit a response to the mobile terminal indicating that algorithm transmission is allowed when the paging area forming unit determines that the processing language is stored in the process language storing unit,
   wherein the receiving unit is configured to receive the algorithm for forming the paging area from the mobile terminal after the transmitting unit transmits the response to the mobile terminal, and the paging area forming unit is configured to form the paging area of the mobile terminal by the algorithm that is transmitted from the mobile terminal.

2. The controller apparatus as set forth in claim 1, wherein the paging area forming unit is configured to form the paging area of the mobile terminal, in accordance with a load condition or traffic distribution of the controller apparatus.

3. The controller apparatus according to claim 1, wherein the algorithm received from the mobile terminal is associated with an application that is started by the mobile terminal and that is related to a communication use of the mobile terminal, wherein the application is one of a plurality of applications on the mobile terminal that are each pre-associated with a respective algorithm of the plurality of algorithms and that include at least an e-mail application.

4. A mobile terminal configured to implement paging control in which, when a controller apparatus receives a packet addressed to the mobile terminal, the controller apparatus transmits a paging notification packet to a paging area of the mobile terminal, so as to obtain location information on the mobile terminal and to determine a forwarding destination of the packet, the mobile terminal comprising:
   an algorithm storage unit configured to store a plurality of algorithms in association with a processing language in which each of the algorithms is written;
   a transmitting unit configured to specify, to the controller apparatus, a processing language in which an algorithm for forming the paging area of the mobile terminal is written;
   a receiving unit configured to receive, from the controller apparatus, a notification as to whether or not the processing language specified to the controller apparatus can be handled by the controller apparatus, wherein the transmitting unit transmits the algorithm for forming the paging area to the controller apparatus when the notification indicates that the controller apparatus can handle the specified processing language; and
   a paging control unit configured to perform the paging control based on information on the paging area formed by the controller apparatus based on the algorithm.

5. The mobile terminal according to claim 4, wherein the application that is started by the mobile terminal and that is associated with the algorithm is the e-mail application.

6. The mobile terminal according to claim 4, wherein the algorithm for forming the paging area is associated with an application that is started by the mobile terminal and that is related to a communication use of the mobile terminal, wherein the application is one of a plurality of applications on the mobile terminal that are each pre-associated with a respective algorithm of the plurality of algorithms and that include at least an e-mail application.

7. A mobile terminal configured to implement paging control in which, when a controller apparatus receives a packet addressed to a mobile terminal, the controller apparatus transmits a paging notification packet to a paging area of the mobile terminal, so as to obtain location information on the mobile terminal and to determine a forwarding destination of the packet, the mobile terminal comprising:
   a processing language storing unit configured to store processing languages which can be handled at the mobile terminal;
   a receiving unit configured to receive from the controller apparatus a processing language in which an algorithm for forming the paging area is written;
   a paging area forming unit configured to determine whether the processing language received from the mobile terminal is stored in the process language storing unit;
   a transmitting unit configured to transmit a response to the controller apparatus indicating that algorithm transmission is allowed when the paging area forming unit determines that the processing language is stored in the process language storing unit,
   wherein the receiving unit is configured to receive the algorithm for forming the paging area from the controller apparatus after the transmitting unit transmits the response to the controller apparatus, and the paging area forming unit is configured to form the paging area of the mobile terminal by the algorithm that is transmitted from the controller apparatus.

8. The mobile terminal as set forth in claim 7, wherein the paging area forming unit is configured to form the paging area of the mobile terminal, in accordance with movement characteristics of the mobile terminal.

9. A controller apparatus configured to implement paging control in which, when the controller apparatus receives a packet addressed to a mobile terminal, the controller apparatus transmits a paging notification packet to a paging area of the mobile terminal, so as to obtain location information on the mobile terminal and to determine a forwarding destination of the packet, the controller apparatus comprising:
   an algorithm storage unit configured to store a plurality of algorithms in association with a processing language in which each of the algorithms is written;
   a transmitting unit configured to specify, to the mobile terminal, a processing language in which an algorithm for forming the paging area of the mobile terminal is written;
   a receiving unit configured to receive, from the mobile terminal, a notification as to whether or not the processing language specified to the mobile terminal can be handled by the mobile terminal, wherein the transmitting unit transmits the algorithm for forming the paging area to the mobile terminal when the notification indicates that the mobile terminal can handle the specified processing language; and a paging control unit configured to perform the paging control based on the paging area formed by the mobile terminal based on the algorithm.

* * * * *